(12) United States Patent
Kim

(10) Patent No.: US 9,958,106 B2
(45) Date of Patent: May 1, 2018

(54) INSULATING MATERIAL PROTECTIVE COVER FOR VALVE UNIT

(71) Applicant: DONG IN ENGINEERING CO., LTD., Gyeongju-si (KR)

(72) Inventor: Kook Soo Kim, Gyeongju-si (KR)

(73) Assignee: DONG IN ENGINEERING CO., LTD., Gyeongju-si (KR)

( * ) Notice: Subject to any disclaimer, the term of this patent is extended or adjusted under 35 U.S.C. 154(b) by 0 days. days.

(21) Appl. No.: 15/546,045

(22) PCT Filed: Jan. 13, 2016

(86) PCT No.: PCT/KR2016/000364
§ 371 (c)(1),
(2) Date: Jul. 25, 2017

(87) PCT Pub. No.: WO2016/126015
PCT Pub. Date: Aug. 11, 2016

(65) Prior Publication Data
US 2018/0003335 A1    Jan. 4, 2018

(30) Foreign Application Priority Data

Feb. 6, 2015   (KR) .................. 10-2015-0018573

(51) Int. Cl.
*F16K 27/12*    (2006.01)
*F16L 59/16*    (2006.01)
(Continued)

(52) U.S. Cl.
CPC ............ *F16L 59/161* (2013.01); *F16K 27/12* (2013.01); *F16K 31/60* (2013.01); *F16L 59/025* (2013.01);
(Continued)

(58) Field of Classification Search
CPC .............. F16K 27/12; Y10T 137/7036; Y10T 137/7062; F16L 59/025; F16L 59/161
See application file for complete search history.

(56) References Cited

U.S. PATENT DOCUMENTS 1,774,732 A * 9/1930 Smith ................... F16L 59/161
138/161
3,724,491 A * 4/1973 Knudsen ............... F16L 59/161
137/375

(Continued)

FOREIGN PATENT DOCUMENTS

JP     62-200892    12/1987
JP    2002-168392    6/2002
(Continued)

*Primary Examiner* — Kevin Murphy
(74) *Attorney, Agent, or Firm* — Lex IP Meister, PLLC

(57) ABSTRACT

The present invention relates to an insulating material protective cover for a valve unit. The insulating material protective cover for a valve unit, according to the present invention, comprises: a first split body including a first plate, first finishing chassis respectively coupled to both end portions of the first plate in the widthwise direction, and second plates perpendicular to the first plate and respectively coupled thereto; a second split body including a third plate, second finishing chassis respectively coupled to both end portions of the third plate in the widthwise direction, and fourth plates perpendicular to the third plate and respectively coupled thereto; and a third split body including a fifth plate, a second finishing chassis coupled to a first end portion of the fifth plate in the widthwise direction, a first finishing chassis coupled to a second end portion of the fifth plate in the widthwise direction, and a sixth plate perpendicular to the fifth plate and coupled thereto.

18 Claims, 16 Drawing Sheets

(51) Int. Cl.
*F16L 59/02* (2006.01)
*F16K 31/60* (2006.01)

(52) U.S. Cl.
CPC .... *Y10T 137/7036* (2015.04); *Y10T 137/7062* (2015.04)

(56) References Cited

U.S. PATENT DOCUMENTS

| | | | | |
|---|---|---|---|---|
| 4,259,981 | A | * | 4/1981 | Busse .................. F16L 59/161 137/375 |
| 4,577,655 | A | * | 3/1986 | Carroll .................. F16K 49/00 137/375 |
| 4,696,324 | A | * | 9/1987 | Petronko ................ F16L 59/04 137/375 |
| 4,807,669 | A | * | 2/1989 | Prestidge, Sr. ....... F16L 59/161 137/375 |
| 4,925,605 | A | * | 5/1990 | Petronko ................ F16L 59/04 264/230 |
| 5,797,415 | A | * | 8/1998 | Nicholson .............. F16L 59/16 137/15.01 |

FOREIGN PATENT DOCUMENTS

| | | |
|---|---|---|
| JP | 3104257 | 9/2004 |
| KR | 20-1998-0057754 | 10/1998 |
| KR | 10-2011-0014570 | 2/2011 |

\* cited by examiner

FIG. 6
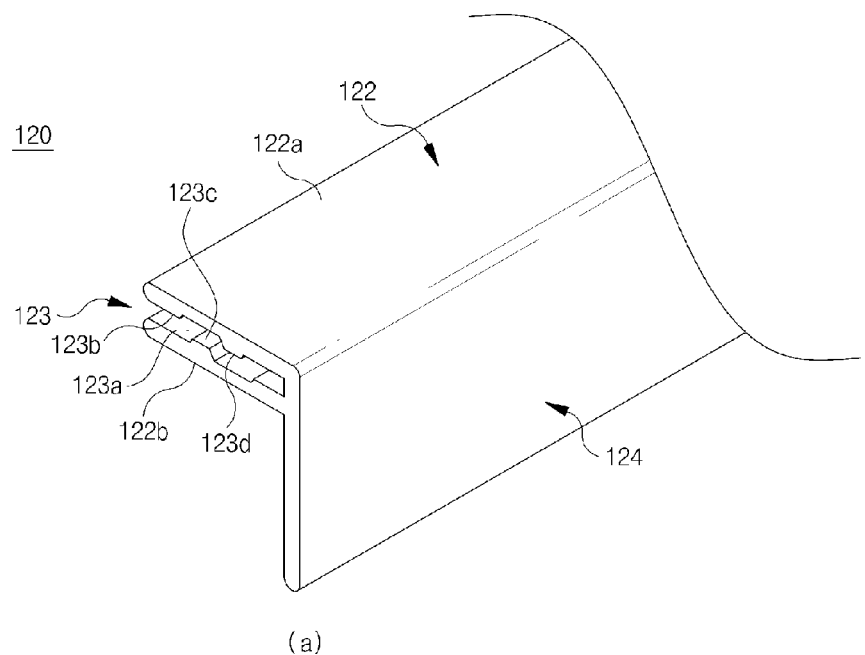
(a)
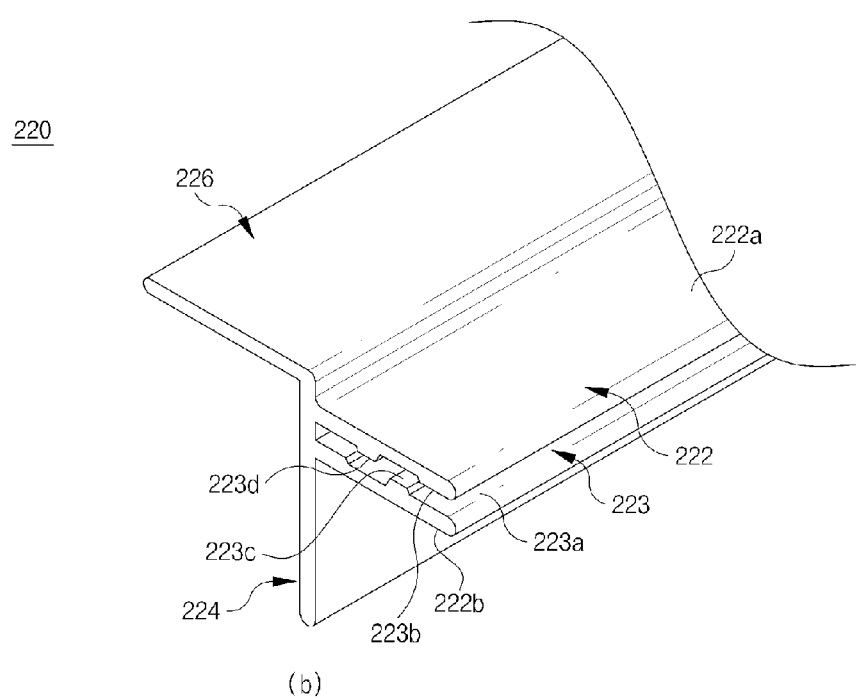
(b)

FIG. 7
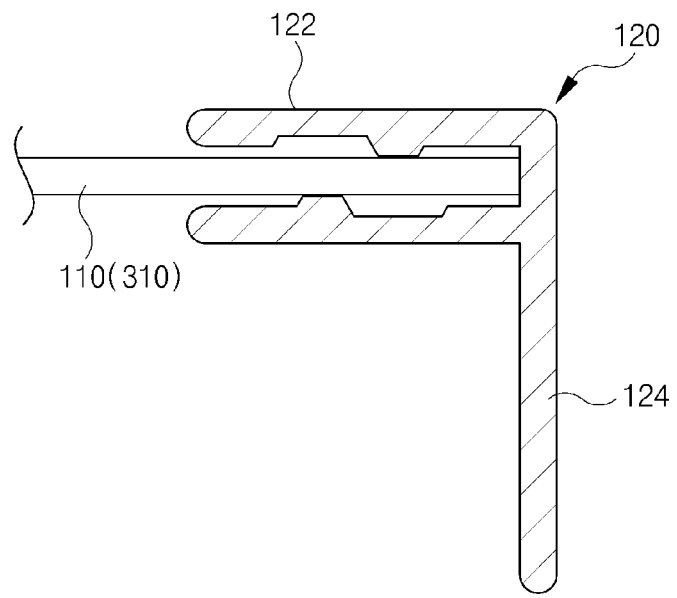
(a)
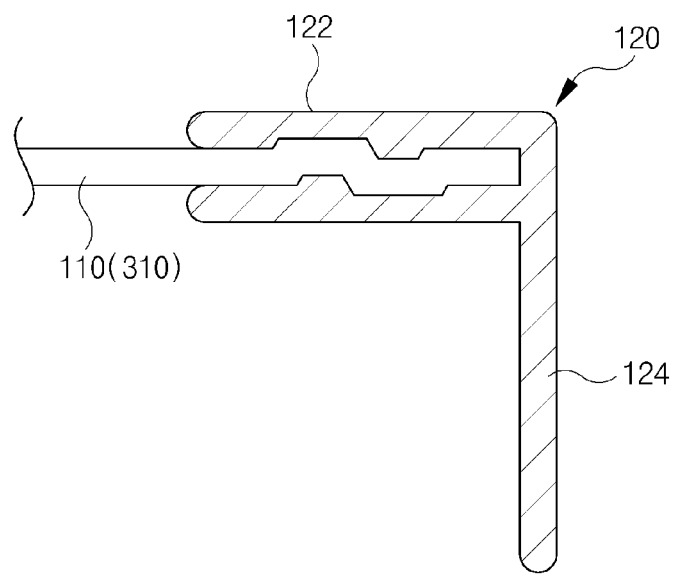

FIG. 8
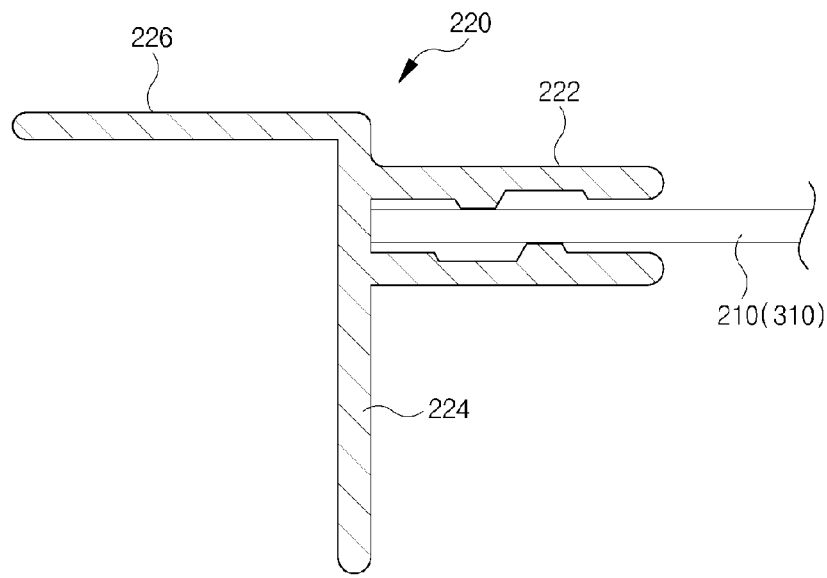
(a)
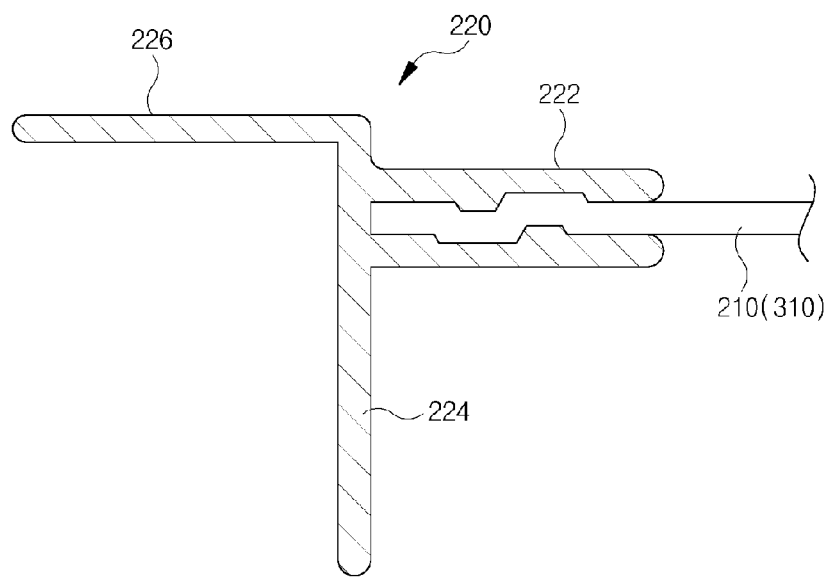
(b)

FIG. 11
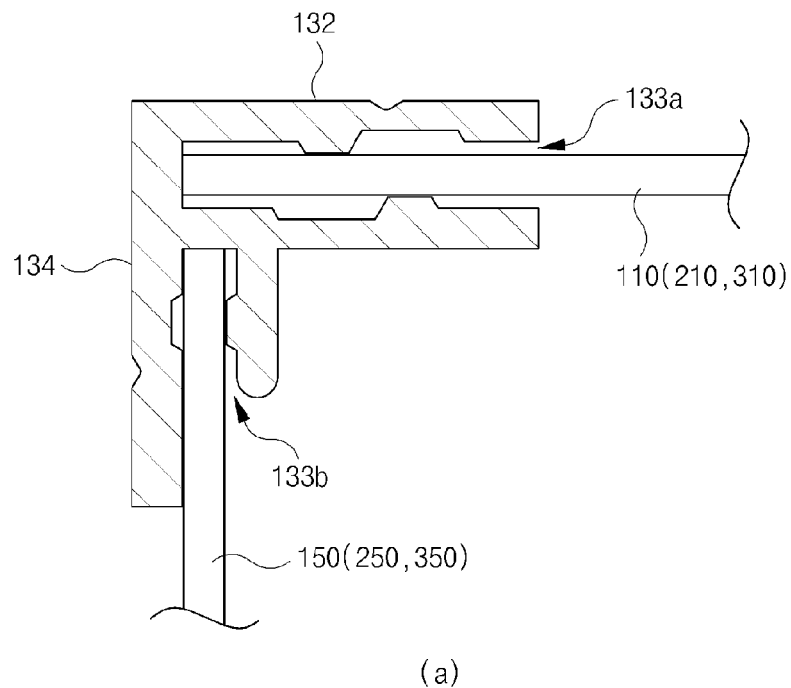
(a)
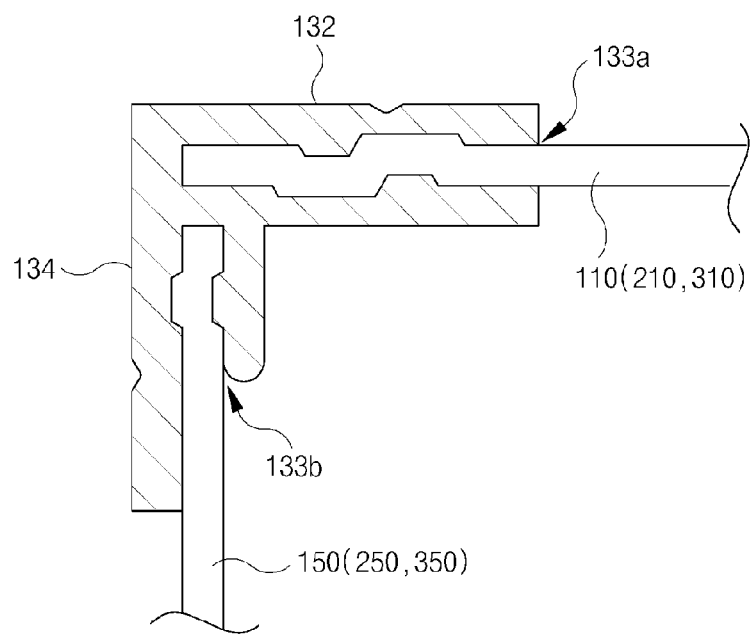
(b)

INSULATING MATERIAL PROTECTIVE COVER FOR VALVE UNIT

TECHNICAL FIELD

The present invention relates to an insulating material protective cover for a valve unit, and more particularly to an insulating material protective cover for a valve unit capable of simplifying the process of manufacturing the insulating material protective cover for a valve unit and improving the stiffness and the assembly accuracy.

BACKGROUND ART

In general, in buildings such as office buildings, industrial buildings, and apartments, various plumbing systems are installed. Such plumbing systems are used with thermal insulation covers installed not only for keeping the plumbing systems warm or cool but also for extension of the lifetimes of the plumbing systems and their appearance designs. Such thermal insulation covers are mainly used for valves, T-shaped pipes, straight pipes, and so on of plumbing systems.

Especially, in power plants (such as nuclear power plants and steam power plants), petrochemical plants, and the like, high-temperature high-pressure steam generated by a boiler provides a torque to a turbine to finally produce electric energy, and high-temperature high-pressure stream or hot water is transported in each system through a plumbing fixture at high speed. In this transport process, fluid friction, cavitation, and the like in pipes may thin the pipes, resulting in a safety accident in a system operating normally. For this reason, during planned preventive maintenance on power generating facilities, pipe thinning (a state where the walls of pipes have thinned due to corrosion and the like) is checked to ascertain the integrity of each facility.

Such pipe thinning phenomenon may cause pin holes in pipes as time goes on, resulting in nasty accidents. For this reason, once a year, planned protective maintenance is carried out on pipes to inspect thinning, and its result is recorded and reported.

When such thinning inspection is performed, in a case where pipes are covered with existing insulating materials, metal protective covers (or finishing covers), the insulating materials, and the like used to finish the outsides of the pipes are sequentially removed, and then the thinning inspection is performed. After this thinning inspection is performed, new insulating materials are attached, and the pipes are finished with protective covers.

The method of attaching insulating materials after a thinning inspection has problems in which the amount of disposal of insulating materials and protective covers which are removed every year causes huge waste of materials and if insulating materials are erroneously attached, thermal notches occur and thus thermal stress increases, whereby the thinning phenomenon remarkably progresses at those parts, resulting in a decrease in the lifetime of the whole plumbing.

A method of overcoming those problems is shown in Korea Patent Laid-Open Publication No. 10-1184392 (Sep. 13, 2012). In Korea Patent Laid-Open Publication No. 10-1184392 (Sep. 13, 2012), an insulation system for plumbing has elbow insulating units, T-fitting insulating units, straight-pipe insulating units, and flange insulating units, wherein each insulating unit has two split bodies, and each split body is composed of a plurality of insulating layers and is covered with a metal finishing cover (or a protecting cover), and the disclosed insulating-material protecting covers are configured with plates having curved surfaces, and are brought into contact with the plumbing so as to cover the plumbing, and are assembled by clamps or the like.

However, the protecting covers having the above-described configuration have low stiffness and thus are likely to be bent. Therefore, it has problem sin which thermal notches are likely to occur at assembly parts, and penetration of water and the like from the assembly parts is easy and deteriorates thermal insulation performance, and damage such as corrosion is likely to occur, and has a problem in which the assembly accuracy decreases.

SUMMARY OF INVENTION

Technical Problem

Therefore, an object of the present invention is to provide an insulating material protective cover for a valve unit capable of overcoming the problems of the related art described above.

Another object of the present invention is to provide an insulating material protective cover for a valve unit capable of being manufactured by a simple process and improving the accuracy of coupling.

A further object of the present invention is to provide an insulating material protective cover for a valve unit capable of improving the stiffness of the protective cover and improving the coupling strength of coupling portions and capable of improving thermal insulation performance and reducing damage attributable to penetration of water and the like.

Solution to Problem

According to embodiments of the present invention for achieving some of the above-mentioned technical objects, an insulating material protective cover for a valve unit according to the present invention is provided for protecting insulating materials provided so as to cover the valve unit for insulation of the valve unit, wherein the valve unit includes a valve body connected between at least two pipes, a shaft protruding from the top of the valve body, and a wheel coupled to the upper end portion of the shaft so as to be rotatable to open and close a valve. The protective cover includes: a first split body including a first plate having a curved surface corresponding to the curved surface of the lower portion of the valve unit or the valve body and having a length corresponding to the length of the valve unit, first finishing chassis coupled to both end portions of the first plate in the widthwise direction, respectively, and second plates coupled to both end portions of the first plate in the lengthwise direction, respectively, so as to be perpendicular to the first plate; a second split body including a third plate having a shape corresponding to one side surface of the upper portion of the valve unit or the valve body and having a length corresponding to the length of the valve unit, second finishing chassis coupled to both end portions of the third plate in the widthwise direction, and fourth plates coupled to both end portions of the third plate in the lengthwise direction, respectively, so as to be perpendicular to the third plate; a third split body including a fifth plate having a shape corresponding to the other side surface of the upper portion of the valve unit or the valve body and having a length corresponding to the length of the valve unit, a second finishing chassis coupled to a first end portion of the fifth plate in the widthwise direction to be brought into contact with the first split body, and a first finishing chassis coupled to a second end portion of the fifth plate in the widthwise direction to be brought into contact with the second split body, and sixth plates coupled to both end portions of the fifth plate in the lengthwise direction so as to be perpendicular to the fifth plate, wherein the protective cover is configured by assembling the first to third split bodies so as to cover valve unit and be separable, the first finishing chassis each has a first coupling portion having a U-like cross-section shape having a first insertion groove for inserting an end portion of the first plate or the fifth plate such that the first finishing chassis can be coupled with the first plate or the fifth plate by pressing the first coupling portion, and a first supporting part formed so as to extend from an end portion of the first coupling portion in a direction perpendicular to the first coupling portion, and having an L-like cross-section shape as a whole, and the second finishing chassis each has a second coupling portion having a U-like cross-section shape having a second insertion groove for inserting an end portion of the third plate or the fifth plate such that the first finishing chassis can be coupled with the third plate or the fifth plate by pressing the first coupling portion, an extension portion formed so as to extend from an end portion of the second coupling portion to the opposite side to the second coupling portion, and a second supporting portion formed so as to extend in a vertical direction from a portion of the second coupling portion and be perpendicular to the second coupling portion and the extension portion, and having a T-like cross-section shape as a whole.

The protective cover may be configured by placing the first coupling portion of the first finishing chassis and the extension portion of the second finishing chassis so as to overlap each other such that the first supporting part of the first finishing chassis and the second supporting portion of the second finishing chassis are brought into contact with each other, and assembling two split bodies adjacent to each other.

On one inner surface of each of the first insertion groove and the second insertion groove, a serrate first protrusion may be formed, and on the other inner surface, a serrate second protrusion may be formed so as to be deviated from the first protrusion.

The first split body may have a semi-circular shape, and the second split body and the third split body may have L-like shapes.

At each of the center of a portion of the third plate to be brought into contact with the third split body and the center of a portion of the fifth plate to be brought into contact with the second split body, a semi-circular groove for passing the shaft may be formed.

The first plate and the second plate, the third plate and each fourth plate, and the fifth plate and each sixth plate may be coupled to each other by joining chassis, the joining chassis each may be configured with a soft metal material having a third insertion groove formed at a first end portion, a fourth insertion groove formed at a second end portion, and a serrate first protrusion formed on one inner surface of each of the third insertion groove and the fourth insertion groove, and a serrate second protrusion formed on the other inner surface, and one end portion of one of the first plate, the third plate, and the fifth plate may be inserted into the third insertion groove, and one end portion of one of the second plates, the fourth plates, and the sixth plates may be inserted into the fourth insertion groove, and then the joining chassis may be pressed such that the corresponding plates are coupled.

The joining chassis each may have an L-like shape bent at a middle portion such that the first end portion and the second end portion forms a predetermined angle with respect to each other.

Each of the first plate to the sixth plates, the first finishing chassis and the second finishing chassis, and the joining chassis may have a soft metal material.

The first split body, the second split body, and the third split body may be assembled by at least one clamp or at least one hinge.

Insulating units may be configured by installing insulating materials inside each of the first split body, the second split body, and the third split body, respectively.

Advantageous Effects of Invention

According to the present invention, attachment and detachment are easy, and it is possible to improve the coupling accuracy, and it is possible to simplify the process. Also, there are effects in which it is possible to improve the stiffness and improve the coupling strength of coupling portions, and it is possible to improve thermal insulation performance and reduce damage attributable to penetration of water and the like.

BRIEF DESCRIPTION OF DRAWINGS

FIG. 6 is a perspective view illustrating a first finishing chassis and a second finishing chassis of FIG. 2.

FIG. 7 is a view illustrating a procedure of coupling the first split body or the third split body to the first finishing chassis.

FIG. 8 is a view for explaining a procedure of coupling the second split body or the third split body to the second finishing chassis.

FIG. 11 is a view for explaining a procedure of coupling individual split bodies to the joining chassis.

BEST MODE FOR CARRYING OUT THE INVENTION

Hereinafter, a preferred embodiment of the present invention will be described in detail with reference to the accompanying drawings, without any intention other than the intention of providing those skilled in the art to which the present invention pertains with a thorough understanding of the present invention.

Figure 1:
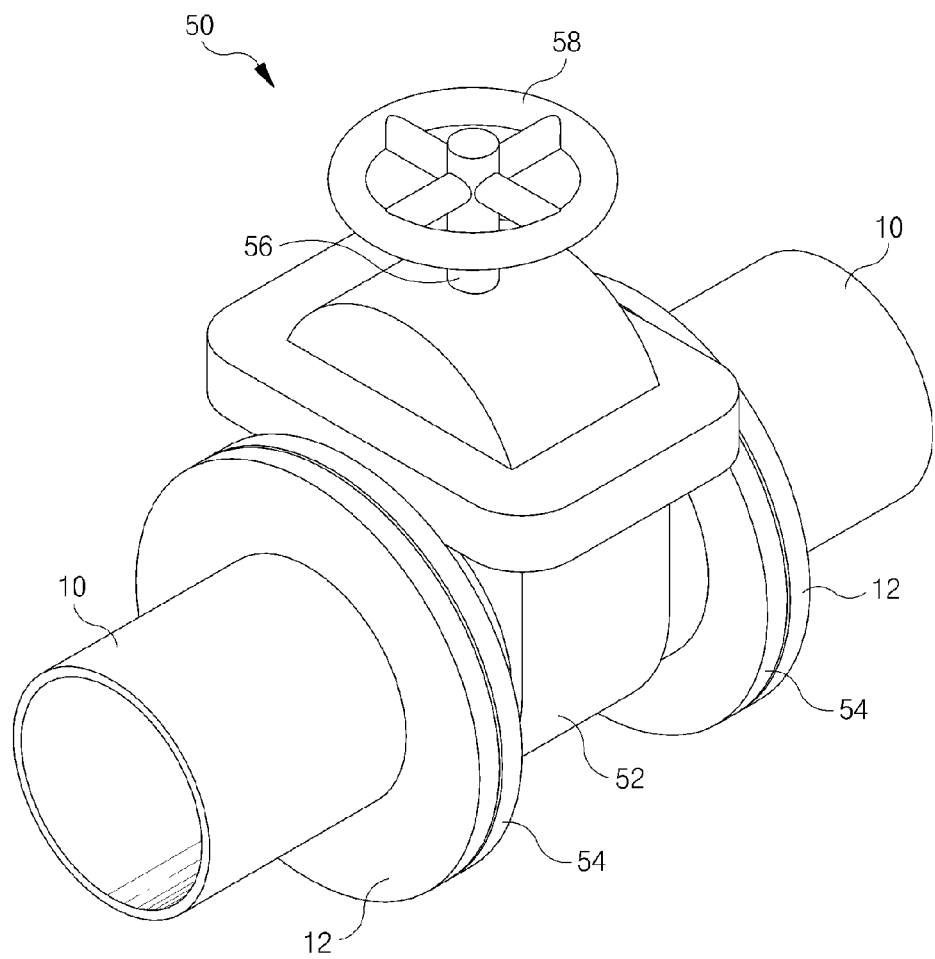
FIG. 1 is a perspective view illustrating a valve unit which is used in general plumbing.

FIG. 1 is a perspective view illustrating a valve unit which is used in general plumbing.

As shown in FIG. 1, a valve unit 50 for plumbing is joined between a plurality of (or at least two) pipes 10 by joining their flanges, so as to connect the pipes and be able to open and close the plumbing, and includes a valve body 52 having a built-in valve, valve flanges 54 formed at both ends of the valve body 52 as portions to be coupled with flanges 120 of the pipes, a shaft 56 protruding from the top of the valve body 520 and joined to the valve, and a wheel 58 coupled to the upper end portion of the shaft 56 so as to be rotatable to open and close the valve.

Figure 2:
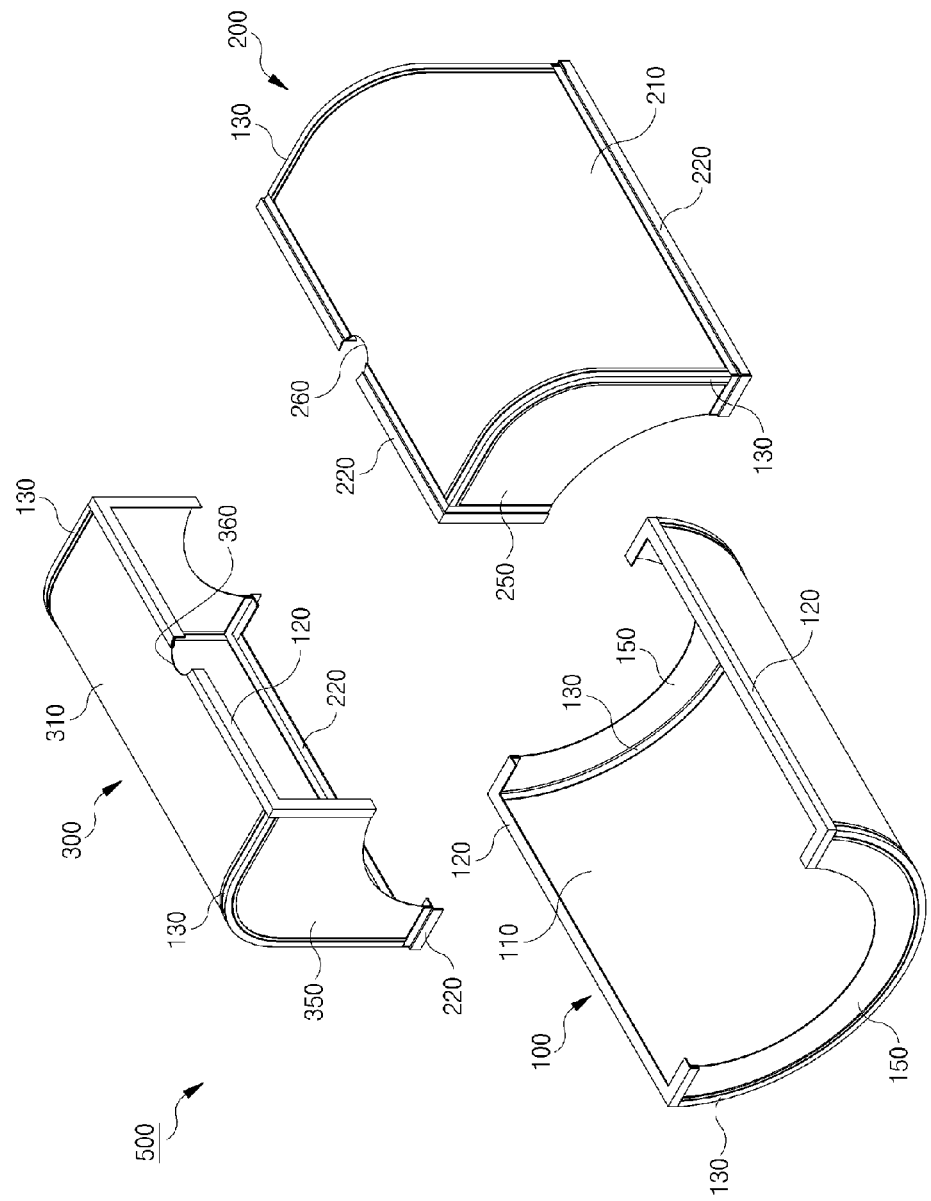
FIG. 2 is an exploded perspective view illustrating an insulating material protective cover for a valve unit according to an embodiment of the present invention.
Figure 3:
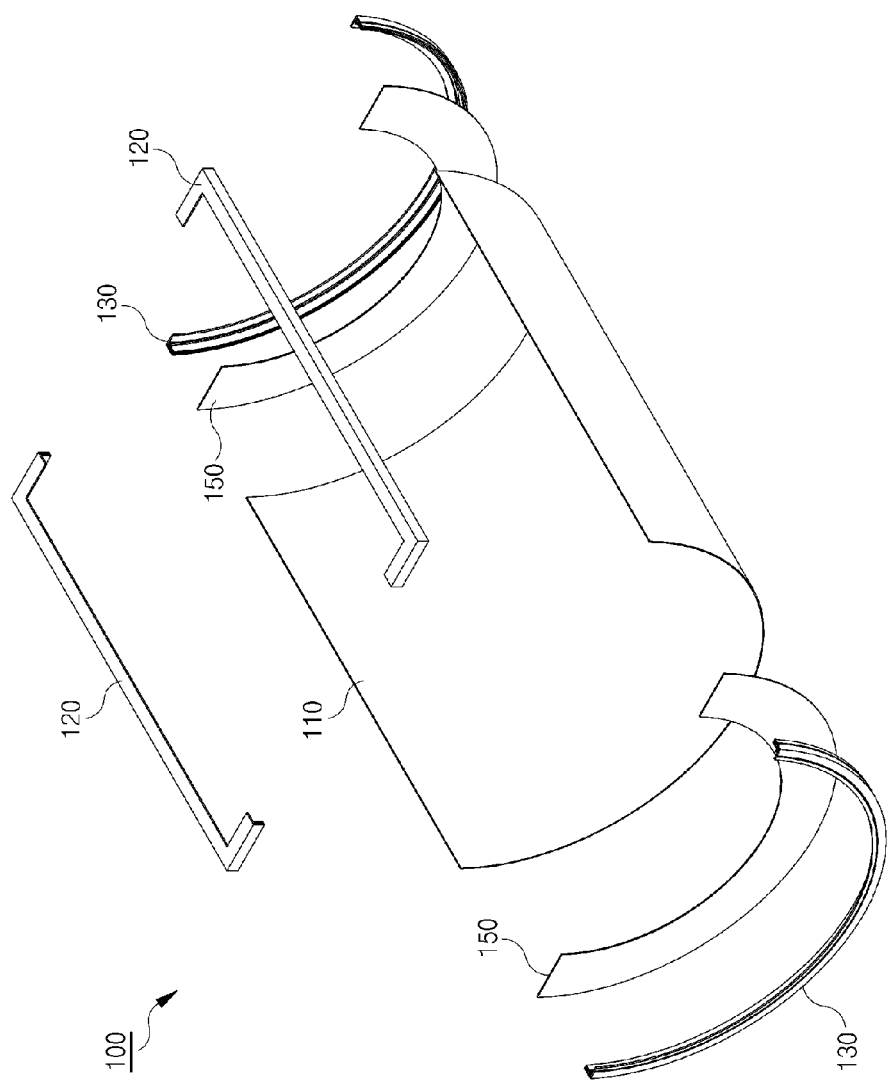
FIG. 3 is an exploded perspective view illustrating a first split body of FIG. 2.
Figure 4:
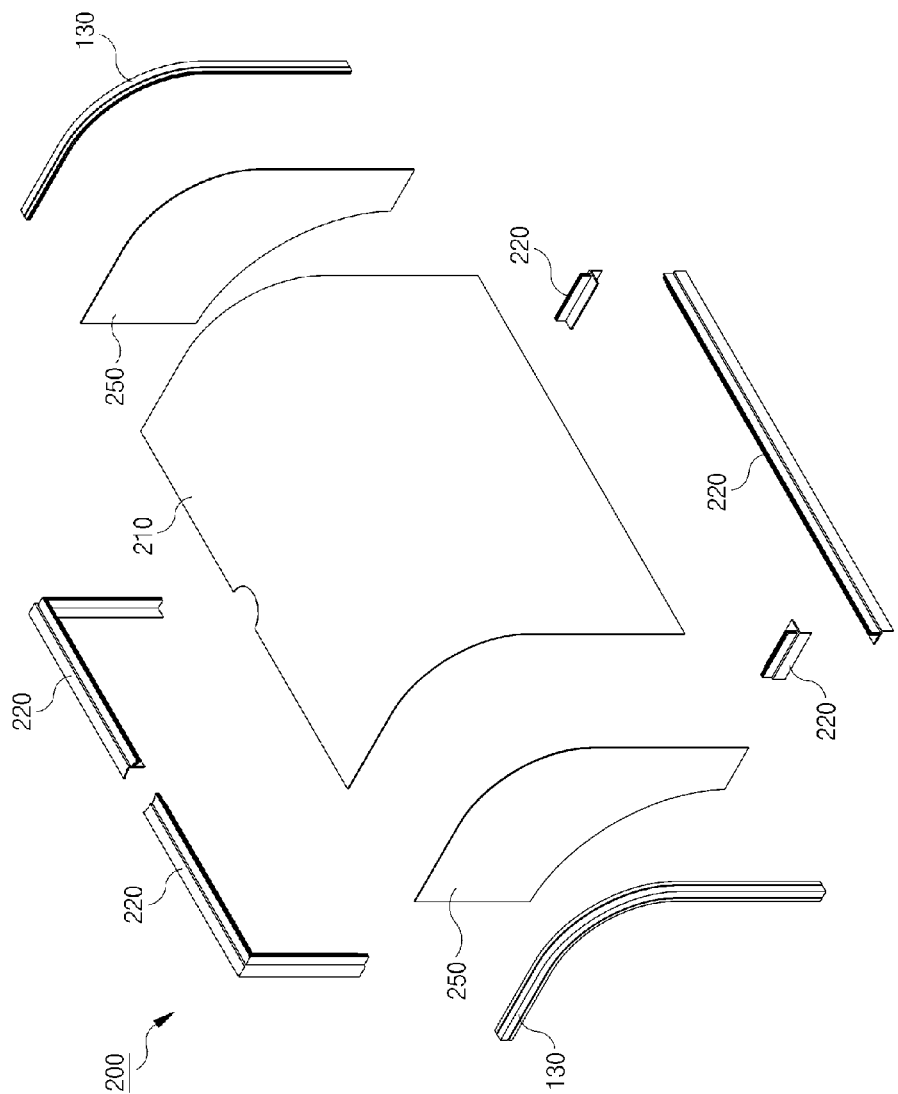
FIG. 4 is an exploded perspective view illustrating a second split body of FIG. 2.
Figure 5:
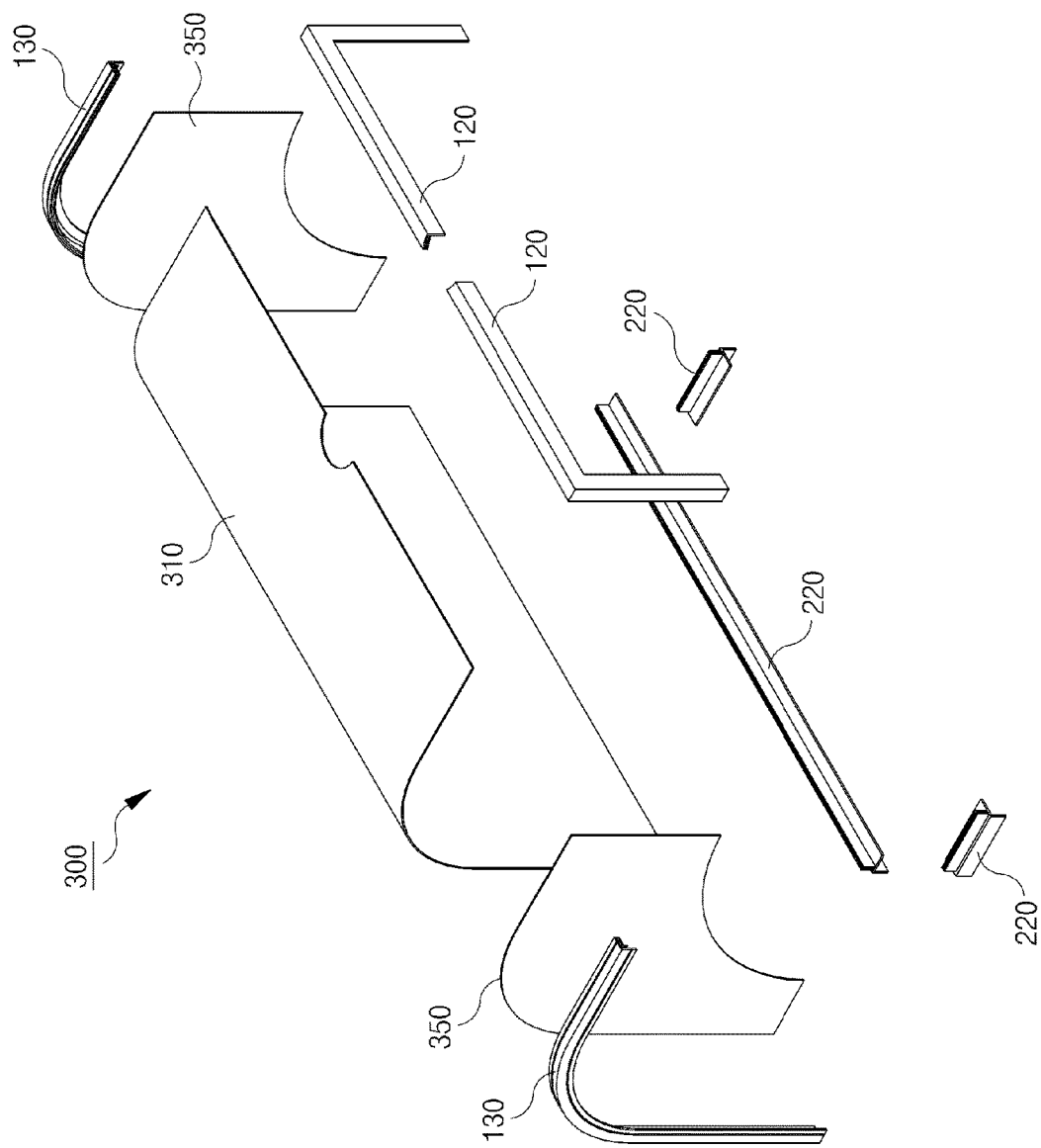
FIG. 5 is an exploded perspective view illustrating a third split body of FIG. 2.

FIG. 2 is an exploded perspective view illustrating an insulating material protective cover 500 for a valve unit according to an embodiment of the present invention, and FIG. 3 is an exploded perspective view illustrating a first split body 100 of FIG. 1, and FIG. 4 is an exploded perspective view illustrating a second split body 200 of FIG. 1, and FIG. 5 is an exploded perspective view illustrating a third split body of FIG. 2.

Hereinafter, a term "lengthwise direction" can mean the same direction as the lengthwise direction of plumbing or the valve unit, and a term "widthwise direction" can mean the same direction as the circumferential direction of plumbing or the widthwise direction of plumbing.

As shown in FIGS. 2 to 5, an insulating material protective cover 500 for a valve unit according to an embodiment of the present invention is configured by assembling the first split body 100, the second split body 200, and the third split body 300. In other words, the first split body 100, the second split body 200, and the third split body 300 are assembled so as to correspond to the curved surface and flat surface of the valve unit 50 and cover a valve unit 50 and be separable, whereby the protective cover 500 is configured.

The first split body 100 has a first plate 110 configured to have a curved surface corresponding to the curved surface of the lower part of the valve unit 50 or the valve body 52 and cover the lower surface of the valve unit 50 or the valve body 52, and first finishing chassis 120 coupled to both end portions of the first plate 110 in the widthwise direction, respectively. Further, the first split body 100 has second plates 150 coupled to both end portions of the first plate 110 in the lengthwise direction, respectively, so as to be perpendicular to the first plate 110 and face each other, and joining chassis 130 configured to couple the first plate 110 and the second plates 150 to each other.

As shown in FIG. 1, in the valve unit 50, the lower portion (the lower portion in the drawing, or the lower portion on the opposite side to the upper portion having the wheel 58) has a curved surface similarly to general plumbing. Therefore, in order to cover the lower part of the valve unit 50, the first split body 100 can be formed so as to have a semi-circular cross-section structure.

The first plate 110 may be a plate formed by machining a flat plate through a process such as rolling so as to have a length corresponding to the length of the valve unit 50 and have a curved surface.

The second plates 150 may have shapes obtained by cutting off inner portions from semi-circular plates such that the lengths between the outer circumferential surfaces and the inner circumferential surfaces become the same, and have structures in which their outer circumferential portions are coupled to both end portions of the first plate 110 in the lengthwise direction so as to be perpendicular to the first plate. For example, each second plate 150 may have the same shape as that of a part of a semi-circular plate which is left if a semi-circular portion having a diameter smaller than that of the semi-circular plate is cut off.

The second split body 200 has a third plate 210 configured to have a shape and a length corresponding to one side surface of the upper part of the valve unit 50 or the valve body 52 and cover the one side surface of the upper part of the valve unit 50 or the valve body 52, and second finishing chassis 220 coupled to both end portions of the third plate 210, respectively. Further, the second split body 200 has fourth plates 250 coupled to both end portions of the third plate 210 in the lengthwise direction, respectively, so as to be perpendicular to the third plate 210 and face each other, and joining chassis 130 configured to couple the third plate 210 and the fourth plates 250 to each other.

The third plate 210 may be a plate formed by machining a flat plate by a process such as rolling so as to have a length corresponding to the valve unit 50 and have a smooth curved surface and have an L-shaped cross-section structure. Therefore, the second split body 200 may have an L-shaped cross-section structure as a whole.

The fourth plates 250 may each have a shape obtained by cutting a one-fourth portion out of a circular plate and cutting off an inner portion from the one-fourth portion such that the width in the vertical direction is larger than the width in the horizontal direction, and their outer circumferential surfaces may be brought into contact with both end portions of the third plate 210 in the lengthwise direction and be coupled thereto so as to be perpendicular to the third plate. Since the joint portion of the valve body 52 and the shaft 56 in the valve unit 50 protrudes, the fourth plates 250 are formed so as to have a large width in the vertical direction such that they can cover the protruding portion.

The third split body 300 has such a shape that the third split body and the second split body 200 are symmetrical to the valve unit 50. However, they are coupled to different types of finishing chassis.

The third split body 300 has a fifth plate 310 configured to have a shape and a length corresponding to one side surface of the upper part of the valve unit 50 or the valve body 52 and cover the one side surface of the upper part of the valve unit 50 or the valve body 52, and a second finishing chassis 220 coupled to a first end portion of the fifth plate 310 in the widthwise direction, and first finishing chassis 120 coupled to a second end portion of the fifth plate 310. Further, the third split body 300 has sixth plates 350 coupled to both end portions of the fifth plate 310 in the lengthwise direction, respectively, so as to be perpendicular to the fifth plate 310 and face each other, and joining chassis 130 configured to couple the fifth plate 310 and the sixth plates 350 to each other.

The fifth plate 310 may be a plate formed by machining a flat plate by a process such as rolling so as to have a length corresponding to the valve unit 50 and have a smooth curved surface and have an L-shaped cross-section structure. Therefore, the third split body 300 may have an L-shaped cross-section structure as a whole.

The sixth plates 350 may each have a shape obtained by cutting a one-fourth portion out of a circular plate and cutting off an inner portion from the one-fourth portion such that the width in the vertical direction is larger than the width in the horizontal direction, and their outer circumferential surfaces may be brought into contact with both end portions of the fifth plate 310 in the lengthwise direction and be coupled thereto so as to be perpendicular to the third plate. Since the joint portion of the valve body 52 and the shaft 56 in the valve unit 50 protrudes, the sixth plates 350 are formed so as to have a large width in the vertical direction such that they can cover the protruding portion.

To the other end portion of the first plate 110 in the widthwise direction, the first finishing chassis 120 may be coupled, or the second finishing chassis 220 may be coupled. Further, to the other end portion of the third plate 210 or the fifth plate 310, the second finishing chassis 220 may be coupled, or the first finishing chassis 120 may be coupled. In some cases, similarly to the case of the fifth plate 310 of the third split body 300, the second finishing chassis 220 may be coupled to the first end portion, and the first finishing chassis 120 may be coupled to the second end portion.

Here, in the case where the first split body 100, the second split body 200, and the third split body 300 are assembled, the first finishing chassis 120 are brought into contact with the second finishing chassis 220, and the first to third split bodies are assembled. Therefore, in a case where the first finishing chassis 120 is coupled to the first end portion of the first plate 110 in the widthwise direction, the second finishing chassis 220 should be coupled to an end portion of the third plate 210 of the second split body 200 or the fifth plate 310 of the third split body 300 in the widthwise direction to be coupled to the first end portion. Also, in a case where the second finishing chassis 220 is coupled to the second end portion of the first plate 110 in the widthwise direction, the first finishing chassis 120 should be coupled to an end portion of the third plate 210 of the second split body 200 or the fifth plate 310 of the third split body 300 in the widthwise direction to be coupled to the second end portion.

The first plate to the sixth plates 110, 150, 210, 250, 310, and 350, the first finishing chassis 120, the second finishing chassis 220, and the joining chassis 130 may include soft metal materials (for example, aluminum materials).

Further, the first finishing chassis 120 and the second finishing chassis 220 can also be coupled to both end portions in the widthwise direction of each second plate 150 to be coupled to the first plate 110, both end portions in the widthwise direction of each fourth plate 250 to be coupled to the third plate 210, and both end portions in the widthwise direction of each sixth plate 350 to be coupled to the fifth plate 310.

At this time, finishing chassis coupled to neighboring plates should be coupled. For example, in a case where the first finishing chassis 120 are coupled to the first plate 110, the first finishing chassis 120 may be coupled to end portions of the second plates 150 in the widthwise direction. In this case, first finishing chassis 120 or second finishing chassis 220 can be configured such that each has an integral structure bent at a right angle at a portion and can be integrally coupled to end portions of both of the first plate 110 and a second plate 150 in the widthwise direction.

Although not shown in the drawings, the first plate 110, the third plate 210, and the fifth plate 310 each has at least one bent protrusion formed so as to have the length from one end portion in the widthwise direction to the other end portion in the widthwise direction and be bent and protrude outward and have a U-like cross-section shape or a semi-circular cross-section shape in order to enhance the stiffness.

However, a plurality of bent protrusions may be provided at regular intervals if necessary in order to enhance the stiffness.

The bent protrusion is formed so as to have a constant width and be long along the widthwise direction of each plate. The bent protrusion is formed so as to have a concave shape on the inner side of the plate and have a protruding structure in a convex shape on the outer side.

Here, at the center of a portion of the third plate 210 of the second split body 200 which is brought into contact with the third split body 300 and the center of a portion of the fifth plate 310 of the third split body 300 which is brought into contact with the second split body 200, semi-circular grooves or holes (hereinafter, referred to simply as grooves) 260 and 360 are formed, respectively, and any first finishing chassis 120 or any second finishing chassis 220 is not coupled to the formation portions of the grooves 260 and 360.

Hereinafter, a case where the first finishing chassis 120 is coupled to the first split body 100, and only the second finishing chassis 220 is coupled to the second split body 200, and the first finishing chassis 120 and the second finishing chassis 220 are coupled to the third split body 300 so as to correspond to assembly parts will be described.

However, this is just illustrative, and the first finishing chassis 120 and the second finishing chassis 220 may be coupled to each of the first plate to the sixth plates 110, 150, 210, 250, 310, and 350 so as to correspond to assembly parts if necessary.

Further, hereinafter, only a case where the finishing chassis 120 and 220 are coupled to the first plate 110, the third plate 210, and the fifth plate 310 will be described; however, it is natural that the finishing chassis 120 and 220 are also be coupled to the second plates 150, the fourth plates 250, and the sixth plates 350 so as to correspond to assembly parts.

The detailed configurations of the first finishing chassis 120 and the second finishing chassis 220 and a coupling method using them will be described with reference to FIGS. 6 to 9.

Figure 9:
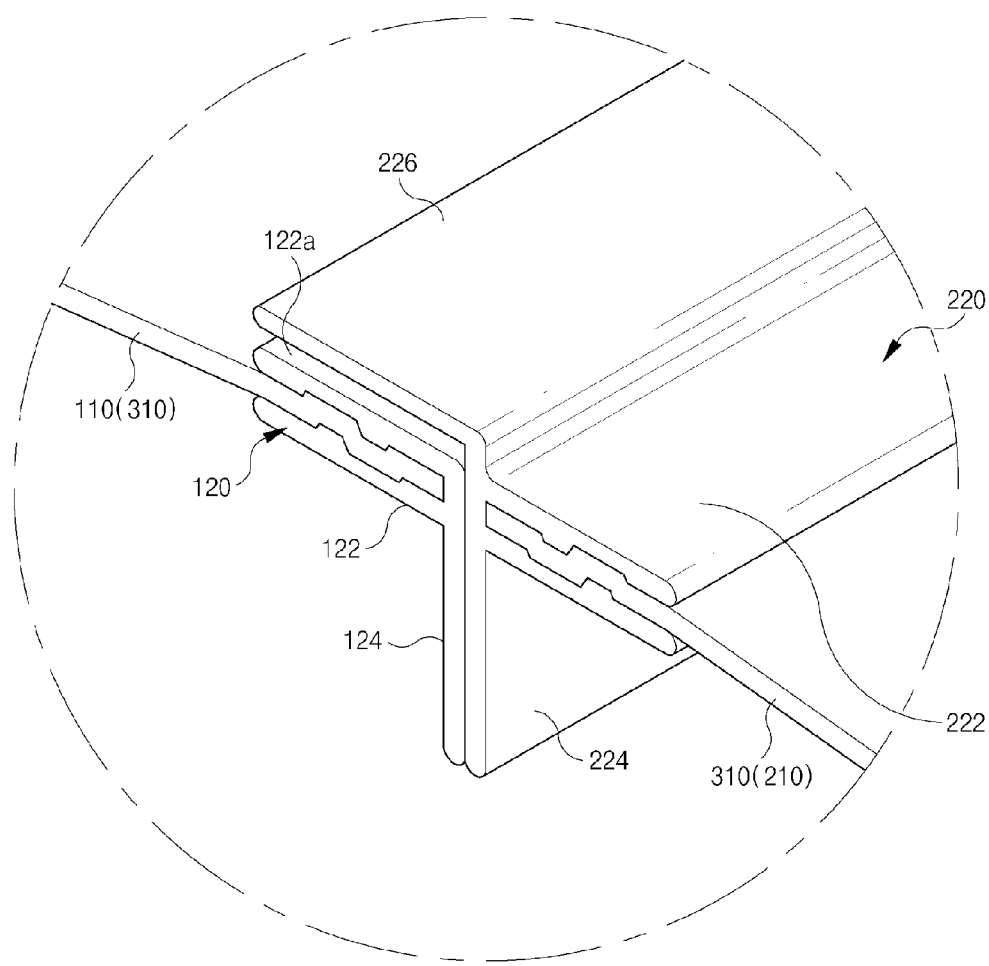
FIG. 9 is a view illustrating an assembly part of the first split body, the second split body, and the third split body.

FIG. 6 is a perspective view of a first finishing chassis and a second finishing chassis of FIG. 2, and FIG. 7 is a view illustrating a procedure of coupling the first split body or the second split body with a first finishing chassis, and FIG. 8 is a view for explaining a procedure of coupling the second split body or the third split body with a second finishing chassis, and FIG. 9 is a view illustrating an assembly part of the first split body, the second split body, and the third split body.

In FIG. 6, (a) is a view illustrating the first finishing chassis 120, and in FIG. 6, (b) is a view illustrating the second finishing chassis 220.

The first finishing chassis 120 and the second finishing chassis 220 may have lengths corresponding to plates to be coupled to the first and second finishing chassis, and may have shapes corresponding to the shapes of end portions of the plates, respectively. Also, in a case where two plates are coupled to each other, an integral finishing chassis can be used to couple them.

As shown in (a) of FIG. 6, the first finishing chassis 120 is configured to have a first coupling portion 122 and a first supporting part 124 and have an L-like cross-section shape as a whole.

The first coupling portion 122 is provided in a U-like cross-section shape having a first insertion groove 123 for inserting an edge portion (or end portion) of the first plate 110 or the fifth plate 310 in the widthwise direction. The first coupling portion 122 has a structure having an upper surface 122a and a lower surface 122b and having the first insertion groove 123 formed as a lateral insertion groove between the upper surface 122a and the lower surface 122b.

On one inner surface (the inner lower surface) 123a of the first insertion groove 123, a serrate first protrusion 123c is formed, and on the other inner surface (or the inner upper surface) 123b, a serrate second protrusion 123d is formed so as to be deviated from the first protrusion 123c. However, a plurality of first protrusions 123c and a plurality of second protrusions 123d may be formed.

The first protrusion 123c and the second protrusion 123d are formed so as not to face each other. In other words, on a portion of the other inner surface 123b directly facing the first protrusion 123c, the second protrusion 123d is not formed, and on an adjacent portion, the second protrusion 123d is formed such that the first protrusion 123c and the second protrusion 123d can be engaged with each other during pressing.

The first supporting part 124 is formed so as to extend vertically from an end portion of the first coupling portion 122. The first supporting part 124 is provided for reinforcing the side surface of an insulating material (not shown in the drawings) installed inside the protective cover 500.

As shown in (b) of FIG. 6, each second finishing chassis 220 has a second coupling portion 222, a second supporting portion 224, and an extension portion 226 and has a T-like cross-section shape as a whole.

The second coupling portion 222 is provided in a U-like cross-section shape having a second insertion groove 223 for inserting an edge portion of the first plate 110 or the fifth plate 310 in the widthwise direction (an end portion in the widthwise direction). The second coupling portion 222 has a structure having an upper surface 222a and a lower surface 222b and the second insertion groove 223 formed as a lateral insertion groove between the upper surface 222a and the lower surface 222b.

On one inner surface (or the inner lower surface) 223a of the second insertion groove 23, a serrate first protrusion 223c is formed, and on the other inner surface (or inner upper surface) 223b, a serrate a second protrusion 223d is formed so as to be deviated from the first protrusion 223c. However, a plurality of first protrusions 223c and a plurality of second protrusions 223d may be formed.

The first protrusion 223c and the second protrusion 223d are formed so as not to face each other. In other words, on a portion of the other inner surface 223b directly facing the first protrusion 223c, the second protrusion 223d is not formed, and on an adjacent portion, the second protrusion 223d is formed such that the first protrusion 223c and the second protrusion 223d can be engaged with each other during pressing.

The second supporting portion 224 is formed so as to extend vertically from an end portion of the second coupling portion 222. The second supporting portion 224 can be provided for reinforcement of the side surface of an insulating material (not shown in the drawings) installed inside the protective cover 500 and firmness of assembling.

The extension portion 226 is formed from an end portion of the second coupling portion 222 so as to extend in the opposite direction to the extension direction of the second coupling portion 222.

Therefore, since the second coupling portion 222 and the extension portion 226 are perpendicular to each other, and the extension portion 226 and the second supporting portion 224 are also perpendicular to each other, the second finishing chassis has a T-like cross-section shape as a whole. For example, in a case where an end portion of the second coupling portion 222 is set as a reference point, from the reference point, the second coupling portion 222 is formed so as to extend to the right and the extension portion 226 is formed so as to extend to the left, and the second supporting portion 224 is formed so as to extend downward.

As shown in (a) of FIG. 7, in a case where the first finishing chassis 120 are coupled to the first plate 110, end portions of the first plate 110 in the widthwise direction (both end portions in the widthwise direction) are inserted into the first insertion grooves 123 of the first coupling portions 122. Then, as shown in (b) of FIG. 7, the first finishing chassis 120 are pressed, thereby being coupled to the first plate 110.

At this time, since the first finishing chassis 120 and the first plate 110 are soft metal materials, the first protrusions 123c and the second protrusions 123d are pressed together with the edge portions of the first plate 110 such that they are engaged with each other with the end portions (edge portions) of the first plate 110 in the widthwise direction interposed therebetween. Therefore, the first finishing chassis 120 are accurately and firmly coupled to the edge portions of the first plate 110 (the end portions in the widthwise direction). The same method is also applied to a case of coupling the first finishing chassis 120 to the fifth plate 310.

Here, since apex portions of the first plate 110 at which the edge portions in the widthwise direction meet the edge portions in the lengthwise direction are portions to which the joining chassis 130 are coupled, the size of the first insertion grooves 123 should be set to be large such that the coupling portions of the joining chassis 130 can be inserted into the first insertion grooves 123, or the insertion grooves of the joining chassis 130 should be formed in such a large size that portions of the first coupling portions 122 of the first finishing chassis 120 can be sufficiently inserted into the joining chassis 130 such that the first finishing chassis can be coupled to the joining chassis.

In a case of coupling the second finishing chassis 220 to the third plate 210, as shown in (a) of FIG. 8, the edge portions of the third plate 210 in the widthwise direction (or the end portions in the widthwise direction) are inserted into the second insertion grooves 223 of the second coupling portions 222. Then, as shown in (b) of FIG. 8, the second finishing chassis 220 are pressed, thereby being coupled to the third plate 210.

At this time, since the second finishing chassis 220 and the third plate 210 are soft metal materials, the first protrusions 223 and the second protrusions 223d are pressed together with the end portions of the third plate 210 such that they are engaged with each other with the edge portions of the third plate 210 interposed therebetween. Therefore, the second finishing chassis 220 are accurately and firmly coupled to the edge portions of the third plate 210. The same method is also applied to a case of coupling the second finishing chassis 220 to the fifth plate 310.

Here, since apex portions of the third plate 210 at which the edge portions in the widthwise direction meet the edge portions in the lengthwise direction are portions to which the joining chassis 130 are coupled, the size of the second insertion grooves 223 should be set to be large such that portions of the joining chassis 130 can be inserted into the second insertion grooves 223, or the insertion grooves of the joining chassis 130 should be formed in such a large size that portions of the second coupling portions 222 of the second finishing chassis 220 can be sufficiently inserted into the joining chassis 130 such that the second finishing chassis can be coupled to the joining chassis.

As described above, the first split body 100 has the first plate 110 and the first finishing chassis 120 and has a structure in which the first finishing chassis 120 are coupled to both edge portions of the first plate 110 in the widthwise direction (both end portions in the widthwise direction). Further, the second split body 200 has the third plate 210 and the second finishing chassis 220 and has a structure in which the second finishing chassis 220 are coupled to both edge portions of the third plate 210 in the widthwise direction (both end portions in the widthwise direction). Also, the third split body 300 has the fifth plate 310, the first finishing chassis 120, and the second finishing chassis 220, and has a structure in which the second finishing chassis 220 is coupled to one end portion (the first end portion) in the widthwise direction and the first finishing chassis 120 is coupled to the other end portion (the second end portion) in the widthwise direction.

Here, in the case where the first split body 100, the second split body 200, and the third split body 300 are assembled, the assembly parts are assembled while the first finishing chassis 120 are brought into contact with the second finishing chassis 220.

In other words, as shown in FIG. 9, in a case of trying to assemble the first split body 100, the second split body 200, and the third split body 300, at the assembly parts, the first coupling portions 122 of the first finishing chassis 120 and the extension portions 226 of the second finishing chassis 220 are placed to overlap each other. In other words, the upper surfaces 122a of the first coupling portions 122 of the first finishing chassis 120 are placed to overlap the lower surfaces of the extension portions 226 of the second finishing chassis 220, and the outer surfaces of the first supporting parts 124 of the first finishing chassis 120 are brought into contact with the outer surfaces of the second supporting portions 224 of the second finishing chassis 220. At this time, since the assembly gaps among the split bodies 100, 200, and 300 (contact gap portions between the first supporting parts 124 and the second supporting portions 224) are covered by the extension portions 226 of the second finishing chassis 220, it is possible to prevent foreign materials such as water from entering from the assembly gaps.

The detailed configuration of the joining chassis 130 and a coupling method using them will be described with reference to FIGS. 10 and 11.

Figure 10:
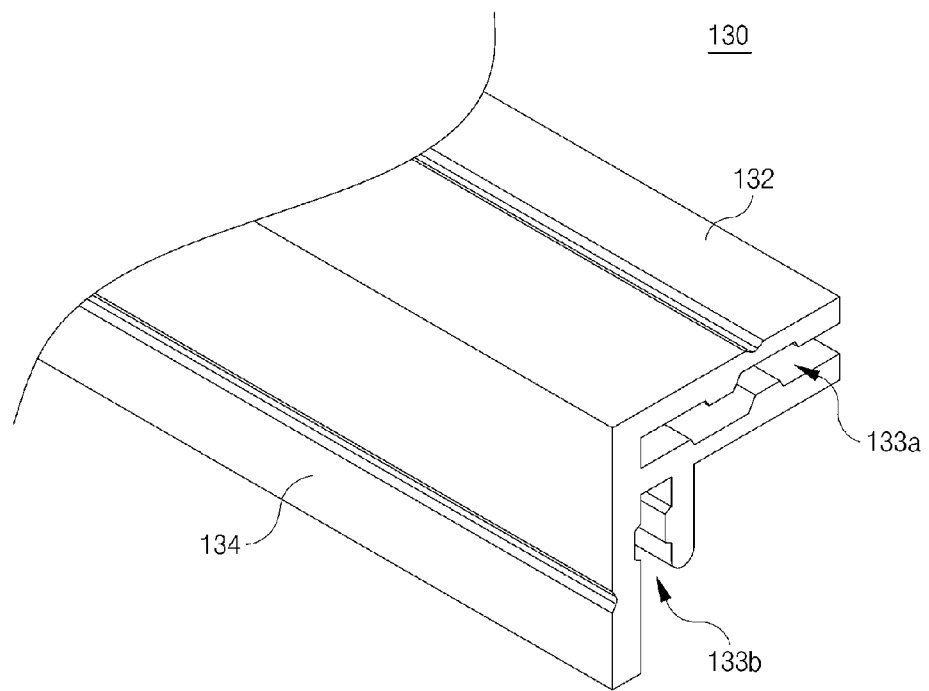
FIG. 10 is a perspective view illustrating a joining chassis of FIG. 2.

FIG. 10 is a perspective view of the joining chassis, and FIG. 11 is a procedure of coupling each split bodies 100, 200, or 300 to the joining chassis.

As shown in FIG. 10, the joining chassis 130 has a third coupling portion 132 which is a first end portion of and a fourth coupling portion 134 which is a second end portion, and is bent at a right angle or a predetermined angle at the middle portion so as to have an L-like cross-section shape.

The third coupling portion 132 is provided in a U-like cross-section shape having a third insertion groove 133a for inserting an edge portion of the third plate 210 or the fifth plate 310 in the lengthwise direction (or both end portions in the lengthwise direction). The internal structure of the third insertion groove 133a is identical or similar to the structures of the first insertion grooves 123 of the first finishing chassis 120.

The fourth coupling portion 134 is provided in a U-like cross-section shape having a fourth insertion groove 133b for inserting an outer circumferential surface portion (an end portion) of a second plate 150, a fourth plate 250, or a sixth plate 350. Inside the fourth insertion groove 133b, a protrusion is formed. This is identical or similar to the first insertion grooves 123 of the first finishing chassis 120. Further, in two surfaces forming the fourth insertion groove 133b, the inner surface may be formed shorter than the outer surface.

The depth and shape of the fourth insertion groove 133b can be variously changed according to the type and shape of a plate to be coupled thereto.

In a case of coupling a joining chassis 130 to the first plate 110, the third plate 210, or the fifth plate 310, as shown in (a) of FIG. 11, an edge portion of the first plate 110, the third plate 210, or the fifth plate 310 in the lengthwise direction (or both end portions in the lengthwise direction) is inserted into the third insertion groove 133a of the third coupling portion 132. Then, in a case of coupling the joining chassis to the first plate 110, a fourth plate 250, or a sixth plate 350, an edge portion (or both end portions in the lengthwise direction) or outer circumferential surface portion of a second plate 150, a fourth plate 250, or a sixth plate 350 is inserted.

In this state, as shown in (b) of FIG. 11, the joining chassis 130 are pressed, whereby the first plate 110 and each second plate 150, the third plate 210 and each fourth plate 250, and the fifth plate 310 and each sixth plate 350 are coupled to each other so as to be perpendicular to each other.

At this time, since the joining chassis 130 are soft metal materials, the third insertion grooves 133a and the fourth insertion grooves 133b are pressed such that they are engaged with plates placed inside them, respectively. Therefore, the first plate 110 and each second plate 150, the third plate 210 and each fourth plate 250, and the fifth plate 310 and each sixth plate 350 are accurately and firmly coupled to each other.

At this time, since apex portions of each plate are portions coupled to the first finishing chassis 120 or the second finishing chassis 220, the third insertion grooves 133a or the fourth insertion grooves 133b can be formed in a predetermined size or larger such that the coupling portions of the finishing chassis 120 or 220 can be inserted into the third insertion grooves 133a or the fourth insertion grooves 133b and be pressed together, thereby being coupled to the finishing chassis.

As described above, the first split body 100 is formed so as to have the first plate 110, the second plates 150, the joining chassis 130, and the first finishing chassis 120 and have a predetermined shape, and the second split body 200 is formed so as to have the third plate 210, the fourth plates 250, the joining chassis 130, and the second finishing chassis 220 and have a predetermined shape, and the third split body 300 is formed so as to have the fifth plate 310, the sixth plates 350, the joining chassis 130, the first finishing chassis 120, and the second finishing chassis 220 and have a predetermined shape.

The protective cover 500 having the above-described structure is configured by assembling the first split body 100, the second split body 200, and the third split body 300. However, in a case where it is actually applied, it is con configured with a first insulating unit configured by providing an insulating material inside the first split body 100, a second insulating unit configured by providing an insulating material inside the second split body 200, and a third insulating unit configured by providing an insulating material inside the third split body 300 and constitutes an insulating system for a valve unit to cover the valve unit 50.

Figure 12:
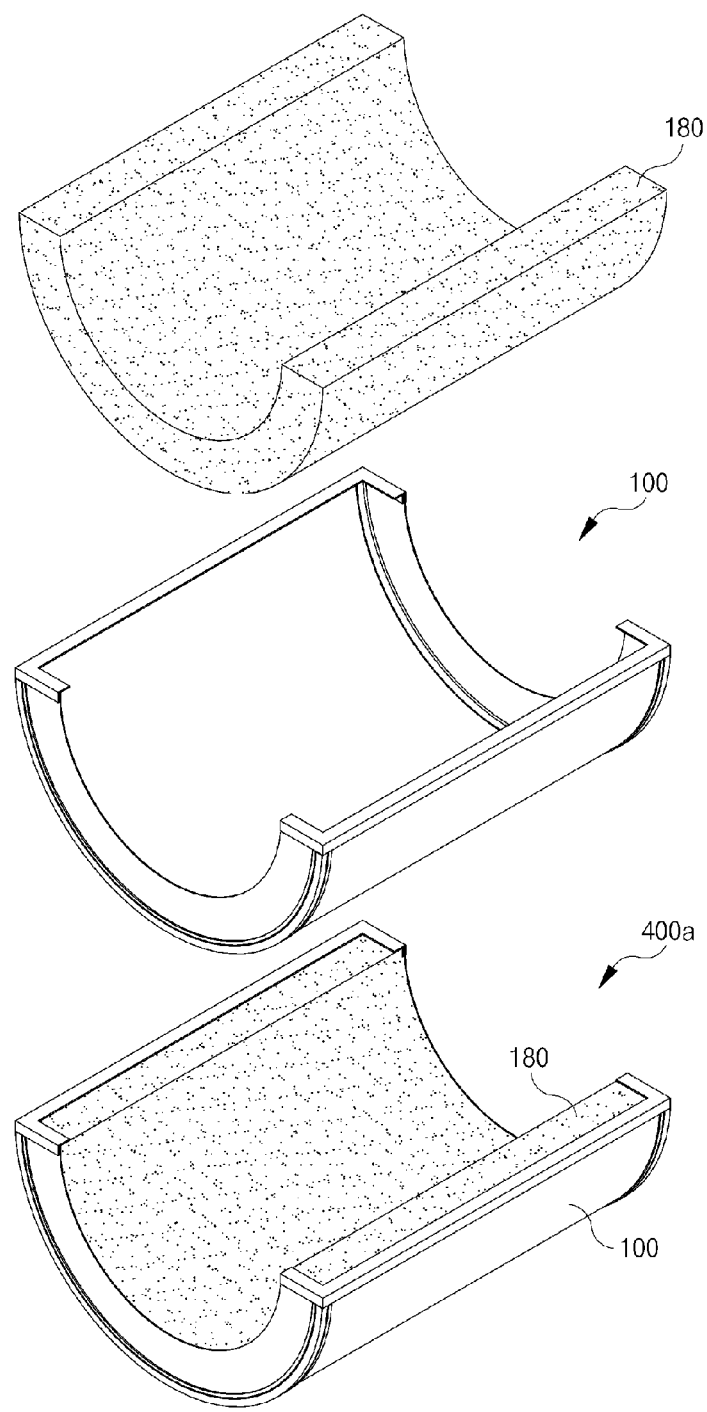
FIG. 12 is a view illustrating a procedure of coupling the first split body with an insulating material, thereby configuring a first insulating unit.
Figure 13:
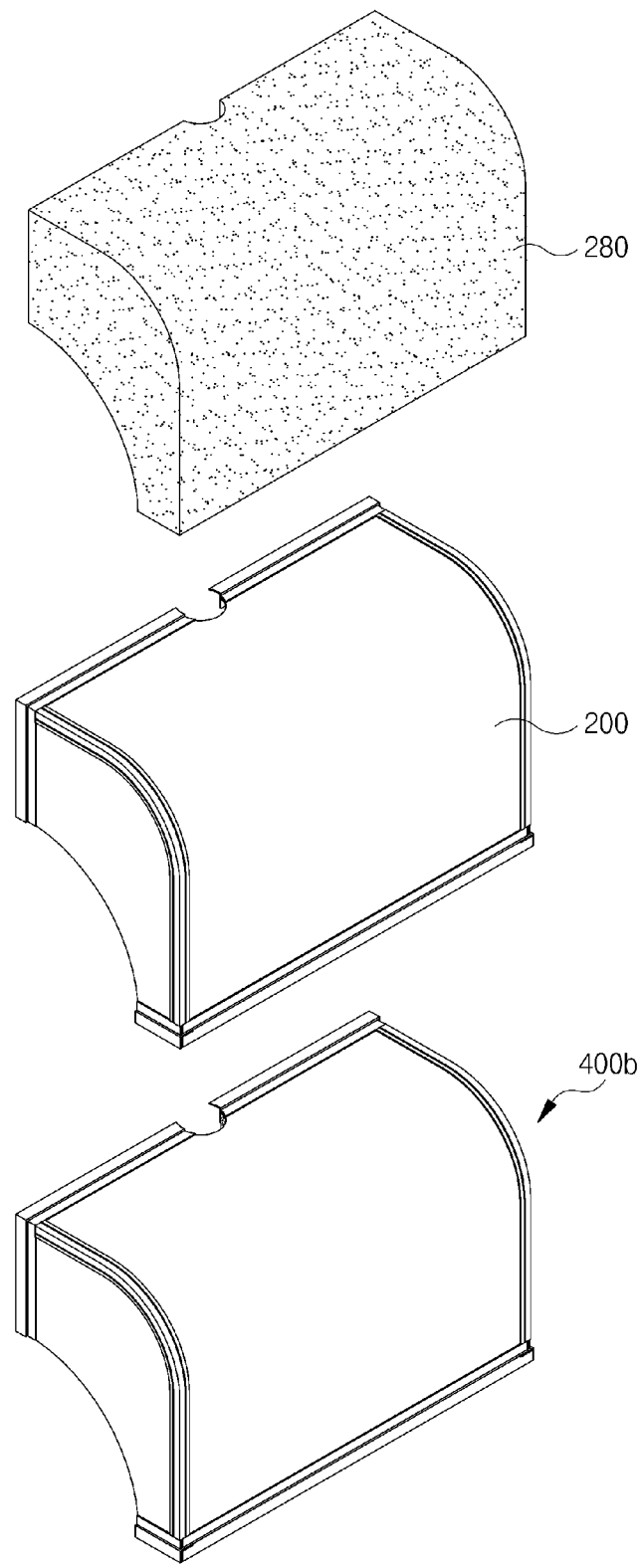
FIG. 13 is a view illustrating a procedure of coupling the second split body with an insulating material, thereby configuring a second insulating unit.
Figure 14:
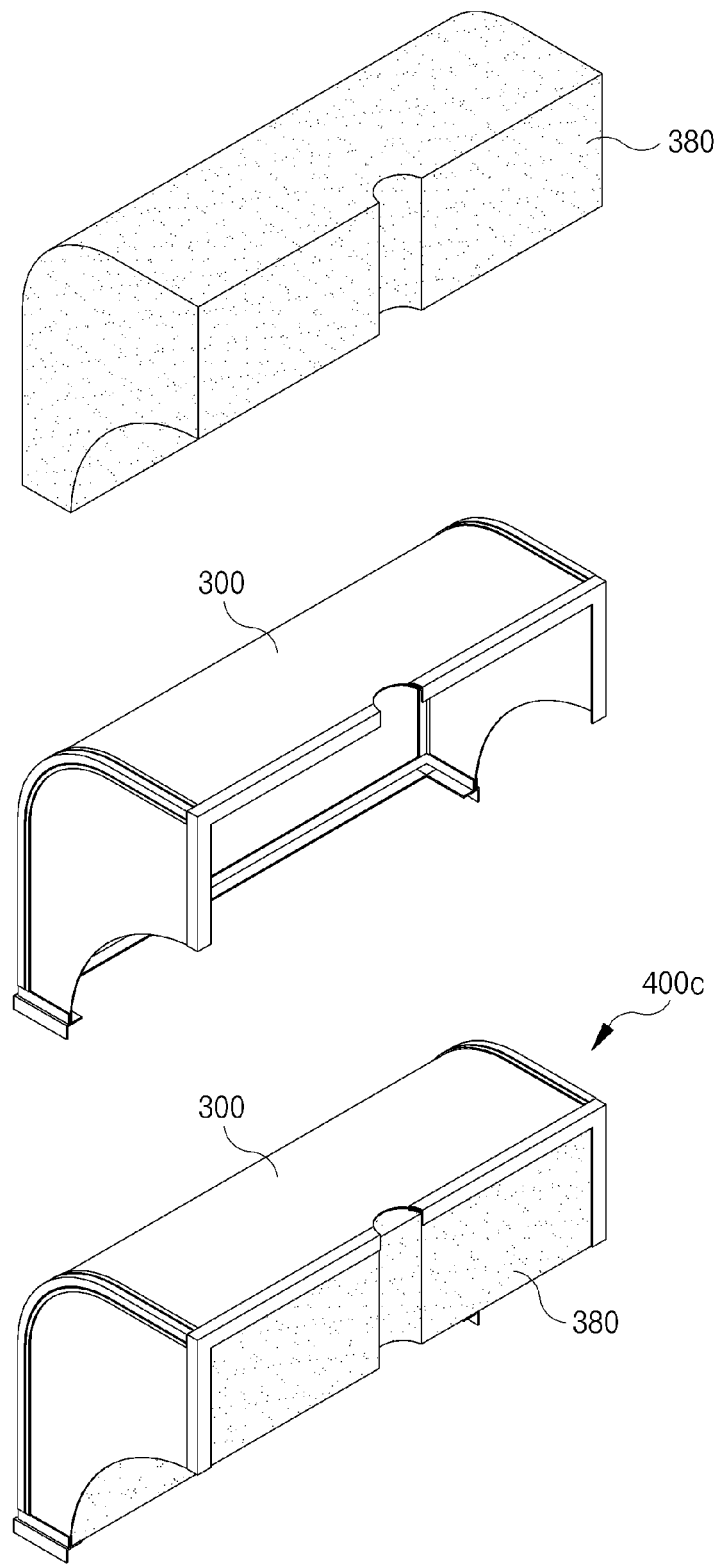
FIG. 14 is a view illustrating a procedure of coupling the third split body with an insulating material, thereby configuring a third insulating unit.

FIG. 12 is a view illustrating a procedure of configuring a first insulating unit 400a by coupling the first split body 100 with an insulating material 180, and FIG. 13 is a view illustrating a procedure of configuring a second insulating unit 400b by coupling the second split body 200 with an insulating material 280, and FIG. 14 is a view illustrating a procedure of configuring a third insulating unit 400c by coupling the third split body 300 with an insulating material 380.

As shown in FIGS. 12 to 14, the first split body 100 is coupled with the insulating material 180, whereby it is possible to configure the first insulating unit 400a.

The insulating material 180 may have a multi-layer structure having an internal insulating layer (not shown in the drawings) to be adjacent to the outer surface of the valve unit 50, an external insulating layer (not shown in the drawings) disposed on the outer side in the radial direction of the internal insulating layer so as to be in contact with the inner surface of the first split body 100, and an intermediate insulating layer (not shown in the drawings) interposed between the internal insulation layer and the external insulating layer, or may have a single layer structure.

The internal insulating layer and the external insulating layer may be configured with a material such as glass wool or mineral wool, and may be configured with polyethylene foam or the like.

The intermediate insulation layer may be configured in a jacket structure having an internal space filled with air or argon gas. Alternatively, the intermediate insulation layer may be configured with a high-temperature insulating material such as HITLIN, or the intermediate insulation layer may be configured with an insulating material different from those of the internal insulating layer and the external insulating layer.

Also, the internal insulating layer, the external insulating layer, and the intermediate insulation layer may be covered and protected by separate insulating layer protective layers.

Figure 16:
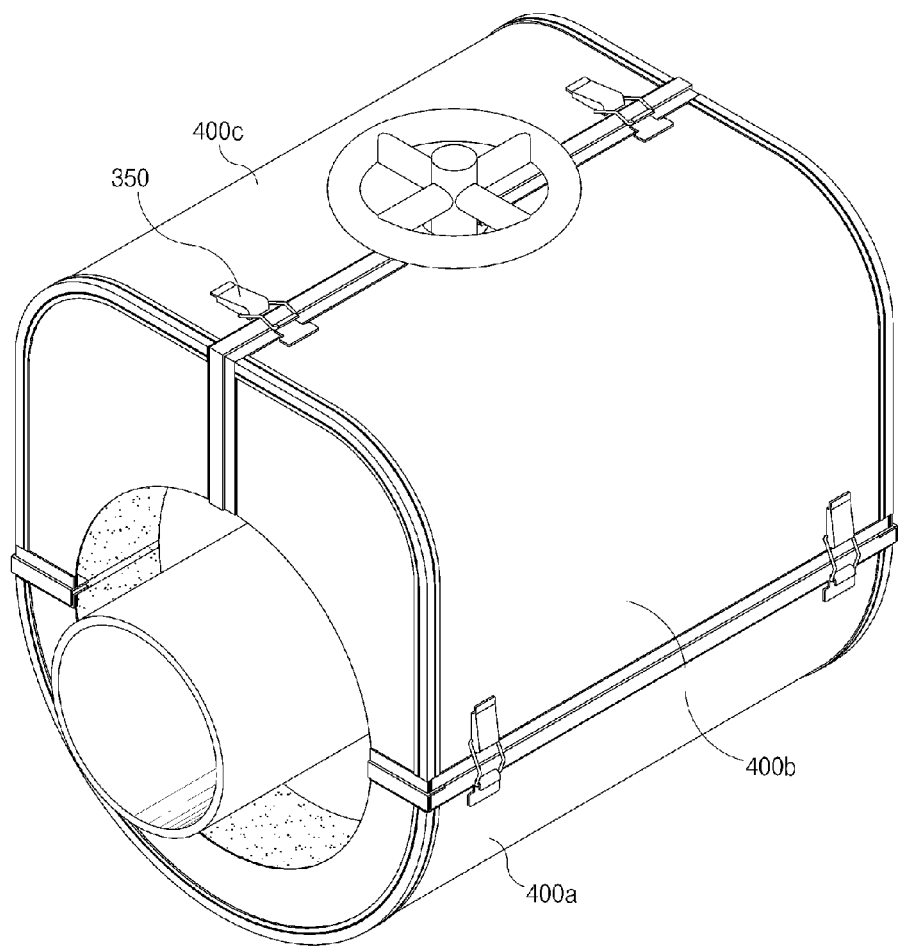
FIG. 16 is a view illustrating a state where the first insulating unit, the second insulating unit, and the third insulating unit have been assembled with a valve unit.

The insulating material 180 is coupled to the inner circumferential surface or inner surface of the first split body 100, whereby the first insulating unit 400a is configured, and the first insulating unit 400a is coupled to a corresponding portion of the valve unit 50 as shown in FIG. 16. The side surfaces of the insulating material 180 are supported by the first supporting parts 124 of the first finishing chassis 120 and the second plates 150. The first supporting parts 124 have a length corresponding to the thickness of the insulating material 180 and thus can support the entire side surfaces of the insulating material 150.

Further, the second split body 200 is coupled with the insulating material 280, whereby the second insulating unit 400b can be configured.

The insulating material 280 may have a multi-layer structure having an internal insulating layer (not shown in the drawings) to be adjacent to the outer surface of the valve unit 50, an external insulating layer (not shown in the drawings) disposed on the outer side in the radial direction of the internal insulating layer, and an intermediate insulating layer (not shown in the drawings) interposed between the internal insulation layer and the external insulating layer, or may have a single layer structure. The structure of the insulating material 280 is identical to that of the first insulating unit 400a.

The insulating material 280 is coupled to the inner circumferential surface or inner surface of the second split body 200, whereby the second insulating unit 400b is configured, and the second insulating unit 400b is coupled to a corresponding portion of the valve unit 50 as shown in FIG. 16. The side surfaces of the insulating material 280 are supported by the second supporting portions 224 of the second finishing chassis 220 and the fourth plates 250. The second supporting portions 224 have a length corresponding to the thickness of the insulating material 280 and can support the entire side surfaces of the insulating material 280.

Further, the third split body 300 is coupled with the insulating material 380, whereby the third insulating unit 400c can be configured.

The insulating material 380 may have a multi-layer structure having an internal insulating layer (not shown in the drawings) to be adjacent to the outer surface of the valve unit 50, an external insulating layer (not shown in the drawings) disposed on the outer side in the radial direction of the internal insulating layer, and an intermediate insulating layer (not shown in the drawings) interposed between the internal insulation layer and the external insulating layer, or may have a single layer structure. The structure of the insulating material 380 is identical to that of the first insulating unit 400a.

The insulating material 380 is coupled to the inner circumferential surface or inner surface of the third split body 300, whereby the third insulating unit 400c is configured, and the third insulating unit 400c is coupled to a corresponding portion of the valve unit 50 as shown in FIG. 16. The side surfaces of the insulating material 380 are supported by the first supporting parts 124 of the first finishing chassis 120, the second supporting portions 224 of the second finishing chassis 220, and the sixth plates 350.

The first insulating unit 400a, the second insulating unit 400b, and the third insulating unit 400c are coupled so as to cover the valve unit 50, and are accurately and firmly assembled with separate clamps or hinges, so as to be separable.

Figure 15:
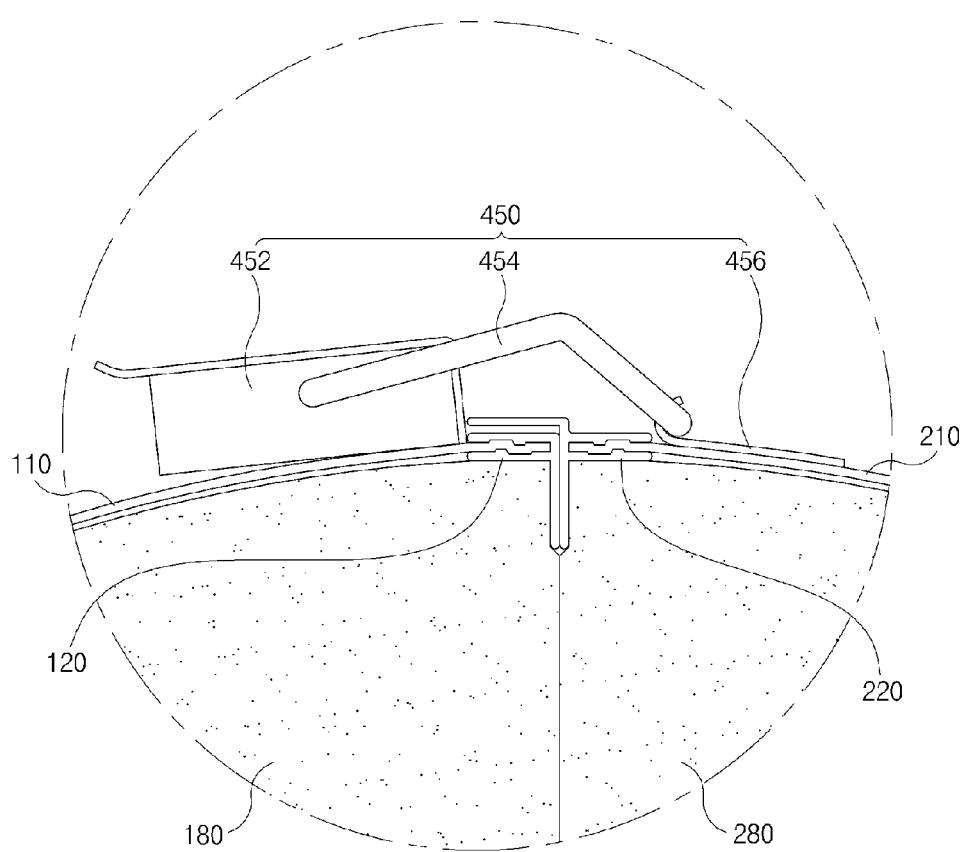
FIG. 15 is a view illustrating a state where the first insulating unit, the second insulating unit, and third insulating unit have been assembled by clamps.

FIG. 15 and FIG. 16 are views illustrating a state where the first insulating unit 400a, the second insulating unit 400b, and the third insulating unit 400c have been assembled with clamps 450. FIG. 15 is a cross-sectional view of an assembly part of the first insulating unit 400a and the second insulating unit 400b, and FIG. 16 is a perspective view illustrating the state where the first insulating unit 400a, the second insulating unit 400b, and the third insulating unit 400c have been assembled with the clamps 450.

Although FIG. 15 and FIG. 16 are views illustrating the state where the first insulating unit 400a, the second insulating unit 400b, and the third insulating unit 400c have been assembled, since portions to which the clamps 450 are joined are portions of the first split body 100, the second split body 200, and the third split body 300, it can be said that the first split body 100, the second split body 200, and the third split body 300 are assembled with clamps 350a and 350b.

As shown in FIG. 15, the first insulating unit 400a can be assembled with each of the second insulating unit 400b and the third insulating unit 400c by a clamp 450 having a hook part 456, a locking part 452, and a connecting ring 454. At this time, one clamp 450 can be used, or a plurality of clamps 450 can be used to firmly assemble them.

The locking part 452 is coupled and fixed to the outer surface of the first plate 110, and the hook part 456 is coupled and fixed to the outer surface of a second plate 150, and the connecting ring 454 is joined to the locking part 452 so as to be rotatable.

During assembling, assembling is performed by hanging the connecting ring 454 on the hook part 456 and pulling the locking part 452 toward the first split body 100 or the first insulating unit 400a such that the connecting ring 454 is joined to the hook part 456 with a predetermined elastic force. In contrast, in a case of performing separating, after the locking part 452 is turned toward the second split body 200 or the second insulating unit 400b and the connecting ring 454 is pulled out of the hook part 456, the first split body 100 and the second split body 200, or the first insulating unit 400a and the second insulating unit 400b are separated.

This assembling method using clamps can also be similarly applied to a case of assembling the first insulating unit 400a and the third insulating unit 400c or assembling the second insulating unit 400b and the third insulating unit 400c.

As described above, in a case of assembling the first insulating unit 400a, the second insulating unit 400b, and the third insulating unit 400c with the clamps 450, there is an advantage that fastening and separating are easy; however, since the size of the clamps 450, when the first insulating unit 400a, the second insulating unit 400b, and the third insulating unit 400c are moved or assembled, damage can occur, and there is the risk of safety accidents.

In short, since the clamps 450 should have a predetermined size and are installed so as to protrude outward from the individual split bodies 100, 200, and 300, during installation and movement in a small space, the protruding clamp parts may damage the first insulating unit 400a, the second insulating unit 400b, and the third insulating unit 400c.

In order to prevent this problem, the first insulating unit 400a, the second insulating unit 400b, and the third insulating unit 400c may be coupled with hinges (not shown in the drawings).

As shown in FIG. 16, the first insulating unit 400a, the second insulating unit 400b, and the third insulating unit 400c can be assembled so as to correspond to the shape of the valve unit 50 and cover the outer surface, and be assembled with the clamps 450.

The first insulating unit 400a, the second insulating unit 400b, and the third insulating unit 400c may be assembled at every assembly part with at least one clamp 450 so as to be separable.

As described above, according to the present invention, an insulating material protective cover to be assembled with a valve unit is configured by coupling a plurality of plates, finishing chassis, and joining chassis. Therefore, attachment and detachment are easy, and it is possible to improve the accuracy of coupling, and it is possible to simplify the process. Also, it is possible to improve the stiffness and improve the coupling strength of coupling portions.

The above description of the embodiment has been taken as an example with reference to the drawings for a more thorough understanding of the present invention, and thus should not be construed as limiting the present invention. Also, it is apparent that those skilled in the art to which the present invention pertains can make various modifications and changes without departing from the fundamental principle of the present invention.

The invention claimed is:

1. An insulating material protective cover for a valve unit for protecting insulating materials provided so as to cover the valve unit for insulation of the valve unit, the valve unit including a valve body connected between at least two pipes, a shaft protruding from the top of the valve body, and a wheel coupled to the upper end portion of the shaft so as to be rotatable to open and close a valve, the protective cover comprising:
   a first split body including a first plate having a curved surface corresponding to a curved surface of a lower portion of the valve unit or the valve body and having a length corresponding to a length of the valve unit, first finishing chassis coupled to both end portions of the first plate in the widthwise direction, respectively, and second plates coupled to both end portions of the first plate in the lengthwise direction, respectively, so as to be perpendicular to the first plate;
   a second split body including a third plate having a shape corresponding to one side surface of an upper portion of the valve unit or the valve body and having a length corresponding to a length of the valve unit, second finishing chassis coupled to both end portions of the third plate in the widthwise direction, and fourth plates coupled to both end portions of the third plate in the lengthwise direction, respectively, so as to be perpendicular to the third plate;
   a third split body including a fifth plate having a shape corresponding to the other side surface of the upper portion of the valve unit or the valve body and having a length corresponding to the length of the valve unit, a second finishing chassis coupled to a first end portion of the fifth plate in the widthwise direction to be brought into contact with the first split body, and a first finishing chassis coupled to a second end portion of the fifth plate in the widthwise direction to be brought into contact with the second split body, and sixth plates coupled to both end portions of the fifth plate in the lengthwise direction so as to be perpendicular to the fifth plate,
   wherein the protective cover is configured by assembling the first to third split bodies so as to cover valve unit and be separable,
   each of the first finishing chassis of the first split body and the first finishing chassis of the third split body has a first coupling portion having a U-like cross-section shape having a first insertion groove for inserting an end portion of the first plate or the fifth plate such that the first finishing chassis can be coupled with the first plate or the fifth plate by pressing the first coupling portion, and a first supporting part formed so as to extend from an end portion of the first coupling portion in a direction perpendicular to the first coupling portion, and having an L-like cross-section shape as a whole, and
   each of the second finishing chassis of the second split body and the second finishing chassis of the third split body has a second coupling portion having a U-like cross-section shape having a second insertion groove for inserting an end portion of the third plate or the fifth plate such that the first finishing chassis can be coupled with the third plate or the fifth plate by pressing the first coupling portion, an extension portion formed so as to extend from an end portion of the second coupling portion to the opposite side to the second coupling portion, and a second supporting portion formed so as to extend in a vertical direction from a portion of the second coupling portion and be perpendicular to the second coupling portion and the extension portion, and having a T-like cross-section shape as a whole.

2. The insulating material protective cover for a valve unit according to claim 1, wherein:
   the first coupling portion of the first finishing chassis and the extension portion of the second finishing chassis are placed so as to overlap each other such that the first supporting part of the first finishing chassis and the second supporting portion of the second finishing chassis are brought into contact with each other, and two split bodies adjacent to each other are assembled, whereby the protective cover is configured.

3. The insulating material protective cover for a valve unit according to claim 2, wherein:

insulating materials are installed inside each of the first split body, the second split body, and the third split body, respectively, whereby insulating units are configured.

4. The insulating material protective cover for a valve unit according to claim 1, wherein:
on one inner surface of each of the first insertion groove and the second insertion groove, a serrate first protrusion is formed, and on the other inner surface, a serrate second protrusion is formed so as to be deviated from the first protrusion.

5. The insulating material protective cover for a valve unit according to claim 4, wherein:
insulating materials are installed inside each of the first split body, the second split body, and the third split body, respectively, whereby insulating units are configured.

6. The insulating material protective cover for a valve unit according to claim 1, wherein:
the first split body has a semi-circular shape, and the second split body and the third split body have L-like shapes.

7. The insulating material protective cover for a valve unit according to claim 6, wherein:
insulating materials are installed inside each of the first split body, the second split body, and the third split body, respectively, whereby insulating units are configured.

8. The insulating material protective cover for a valve unit according to claim 1, wherein:
at each of the center of a portion of the third plate to be brought into contact with the third split body and the center of a portion of the fifth plate to be brought into contact with the second split body, a semi-circular groove for passing the shaft is formed.

9. The insulating material protective cover for a valve unit according to claim 8, wherein:
insulating materials are installed inside each of the first split body, the second split body, and the third split body, respectively, whereby insulating units are configured.

10. The insulating material protective cover for a valve unit according to claim 1, wherein:
the first plate and the second plate, the third plate and each fourth plate, and the fifth plate and each sixth plate are coupled to each other by joining chassis,
the joining chassis each are configured with a soft metal material having a third insertion groove formed at a first end portion, a fourth insertion groove formed at a second end portion, and a serrate first protrusion formed on one inner surface of each of the third insertion groove and the fourth insertion groove, and a serrate second protrusion formed on the other inner surface, and
one end portion of one of the first plate, the third plate, and the fifth plate is inserted into the third insertion groove, and one end portion of one of the second plates, the fourth plates, and the sixth plates is inserted into the fourth insertion groove, and then the joining chassis is pressed such that the corresponding plates are coupled.

11. The insulating material protective cover for a valve unit according to claim 10, wherein:
insulating materials are installed inside each of the first split body, the second split body, and the third split body, respectively, whereby insulating units are configured.

12. The insulating material protective cover for a valve unit according to claim 10, wherein:
the joining chassis each have an L-like shape bent at a middle portion such that the first end portion and the second end portion forms a predetermined angle with respect to each other.

13. The insulating material protective cover for a valve unit according to claim 12, wherein:
insulating materials are installed inside each of the first split body, the second split body, and the third split body, respectively, whereby insulating units are configured.

14. The insulating material protective cover for a valve unit according to claim 10, wherein:
each of the first plate to the sixth plates, the first finishing chassis and the second finishing chassis, and the joining chassis has a soft metal material.

15. The insulating material protective cover for a valve unit according to claim 14, wherein:
insulating materials are installed inside each of the first split body, the second split body, and the third split body, respectively, whereby insulating units are configured.

16. The insulating material protective cover for a valve unit according to claim 1, wherein:
the first split body, the second split body, and the third split body are assembled by at least one clamp or at least one hinge.

17. The insulating material protective cover for a valve unit according to claim 16, wherein:
insulating materials are installed inside each of the first split body, the second split body, and the third split body, respectively, whereby insulating units are configured.

18. The insulating material protective cover for a valve unit according to any one of claim 1, wherein:
insulating materials are installed inside each of the first split body, the second split body, and the third split body, respectively, whereby insulating units are configured.

* * * * *